United States Patent
Seth et al.

(10) Patent No.: US 11,159,617 B1
(45) Date of Patent: Oct. 26, 2021

(54) APPARATUS, SYSTEM, AND METHOD FOR SYNCHRONIZING REPLICATED OBJECTS ACROSS NETWORK NODES IN HIGHLY SCALED ENVIRONMENTS

(71) Applicant: Juniper Networks, Inc., Sunnyvale, CA (US)

(72) Inventors: Sameer Seth, Sunnyvale, CA (US); Ananda Kumar M R, Sunnyvale, CA (US); Manoj Namballa, Sunnyvale, CA (US)

(73) Assignee: Juniper Networks, Inc, Sunnyvale, CA (US)

( * ) Notice: Subject to any disclaimer, the term of this patent is extended or adjusted under 35 U.S.C. 154(b) by 0 days.

(21) Appl. No.: 17/155,332

(22) Filed: Jan. 22, 2021

(51) Int. Cl.
  *H04L 29/08* (2006.01)
  *H04L 12/26* (2006.01)

(52) U.S. Cl.
  CPC .......... *H04L 67/1095* (2013.01); *H04L 43/08* (2013.01); *H04L 67/142* (2013.01); *H04L 67/146* (2013.01)

(58) Field of Classification Search
  CPC ...................................................... H04L 43/08
  USPC ......................................................... 709/223
  See application file for complete search history.

(56) References Cited

U.S. PATENT DOCUMENTS

| | | | | |
|---|---|---|---|---|
| 5,287,505 A * | 2/1994 | Calvert | ................ | G06F 11/0748 |
| 6,047,289 A * | 4/2000 | Thorne | ................... | G06F 16/27 |
| 6,345,308 B1 * | 2/2002 | Abe | ........................ | H04L 29/06 709/248 |
| 7,587,422 B2 * | 9/2009 | Wong | ...................... | H04L 29/06 |
| 8,363,549 B1 * | 1/2013 | Zhu | ...................... | H04L 63/0218 370/235 |
| 2002/0184239 A1 * | 12/2002 | Mosher, Jr. | ......... | G06F 11/1474 |
| 2003/0123389 A1 * | 7/2003 | Russell | ................. | G06F 11/273 370/230 |
| 2003/0182414 A1 * | 9/2003 | O'Neill | ................. | G06F 9/3004 709/223 |
| 2008/0189498 A1 * | 8/2008 | Brown | ................ | G06F 11/1004 711/162 |
| 2009/0282125 A1 * | 11/2009 | Jeide | ................... | H04L 67/1095 709/217 |
| 2012/0233118 A1 * | 9/2012 | Holt | ..................... | G06F 16/2219 707/620 |
| 2016/0321338 A1 * | 11/2016 | Isherwood | .......... | H04L 67/1097 |
| 2020/0201918 A1 * | 6/2020 | Karande | ............. | H04L 65/4015 |

\* cited by examiner

*Primary Examiner* — Wing F Chan
*Assistant Examiner* — Leon Y Tseng
(74) *Attorney, Agent, or Firm* — FisherBroyles, LLP

(57) ABSTRACT

A disclosed method may include (1) detecting, on a primary node within a network, a change made to an object replicated across the primary node and a backup node within the network, (2) modifying a state-update message destined for the backup node to account for the change made to the object on the primary node, (3) inspecting a status flag of the state-update message destined for the backup node, (4) determining, based at least in part on the status flag of the state-update message, that the state-update message is ready for transmission to the backup node, and then in response to determining that the state-update message is ready for transmission, (5) transmitting the state-update message to the backup node to facilitate replicating the change to the object on the backup node. Various other apparatuses, systems, and methods are also disclosed.

20 Claims, 8 Drawing Sheets

APPARATUS, SYSTEM, AND METHOD FOR SYNCHRONIZING REPLICATED OBJECTS ACROSS NETWORK NODES IN HIGHLY SCALED ENVIRONMENTS

BACKGROUND

Networks often include network nodes that provide services and/or traffic forwarding with high availability. To achieve availability for such services and/or traffic forwarding, some of these network nodes may need to include, provide, and/or share a set of replicated objects with one another. In addition, some of these network nodes may need to update and/or synchronize the states of such replicated objects relative to one another.

In some examples, network nodes may facilitate and/or provide high availability of network sockets with certain parameters. In such examples, one of these network nodes may actively support the network sockets and/or change one or more of the parameters of the network sockets. In a traditional synchronization technology, this network node may generate 100 parameter updates for each network socket per second. For example, this network node may actively support 30,000 Border Gateway Protocol (BGP) connections. In this example, each of these 30,000 BGP connections may cause and/or necessitate 100 Transmission Control Protocol (TCP) updates per second. As a result, this network node may be responsible for generating and/or transmitting 3,000,000 TCP updates per second in the traditional synchronization technology.

Unfortunately, this network node may need to allocate and subsequently free memory for each of these 3,000,000 TCP updates very rapidly, thereby imposing a heavy burden and/or load. Moreover, many of these TCP updates may no longer be of much importance by the time they are actually transmitted by the network node. For example, the network node may change one or more parameters of a BGP connection even before TCP updates carrying earlier changes to such parameters have been transmitted. In this example, the network node may queue these TCP updates chronologically for transmission, but the last TCP update for a given BGP connection may carry the most relevant and/or up-to-date parameter state. As a result, many of the TCP updates contributing to the heavy burden and/or load imposed on the network node may be of little importance at the time of transmission, thereby potentially wasting computing and/or memory resources of the network node.

The instant disclosure, therefore, identifies and addresses a need for additional apparatuses, systems, and methods for synchronizing replicated objects across network nodes in highly scaled environments.

SUMMARY

As will be described in greater detail below, the instant disclosure generally relates to apparatuses, systems, and methods for synchronizing replicated objects across network nodes in highly scaled environments. In one example, a method for accomplishing such a task may include (1) detecting, on a primary node within a network, a change made to an object replicated across the primary node and a backup node within the network, (2) modifying a state-update message destined for the backup node to account for the change made to the object on the primary node, (3) inspecting a status flag of the state-update message destined for the backup node, (4) determining, based at least in part on the status flag of the state-update message, that the state-update message is ready for transmission to the backup node, and then in response to determining that the state-update message is ready for transmission, (5) transmitting the state-update message to the backup node to facilitate replicating the change to the object on the backup node.

Similarly, a system that implements the above-identified method may include a physical processor configured to execute various modules stored in memory on a network node within a network. In one example, this system may include and/or execute (1) a detection module that detects a change made to an object replicated across a primary node and a backup node within a network, (2) a message module that modifies a state-update message destined for the backup node to account for the change made to the object on the primary node, (3) an inspection module that (A) inspects a status flag of the state-update message destined for the backup node and (B) determines, based at least in part on the status flag of the state-update message, that the state-update message is ready for transmission to the backup node, and (4) a transmission module that transmits the state-update message to the backup node to facilitate replicating the change to the object on the backup node.

Additionally or alternatively, an apparatus that implements the above-identified method may include at least one storage device that stores a set of objects replicated across a primary node and a backup node within a network. The apparatus may also include at least one physical processor communicatively coupled to the storage device. In one example, the physical processor (1) detects, on the primary node, a change made to one of the objects replicated across the primary node and a backup node within the network, (2) modifies a state-update message destined for the backup node to account for the change made to the one of the objects on the primary node, (3) inspects a status flag of the state-update message destined for the backup node, (4) determines, based at least in part on the status flag of the state-update message, that the state-update message is ready for transmission to the backup node, and then (5) transmits, in response to determining that the state-update message is ready for transmission, the state-update message to the backup node to facilitate replicating the change to the object on the backup node.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
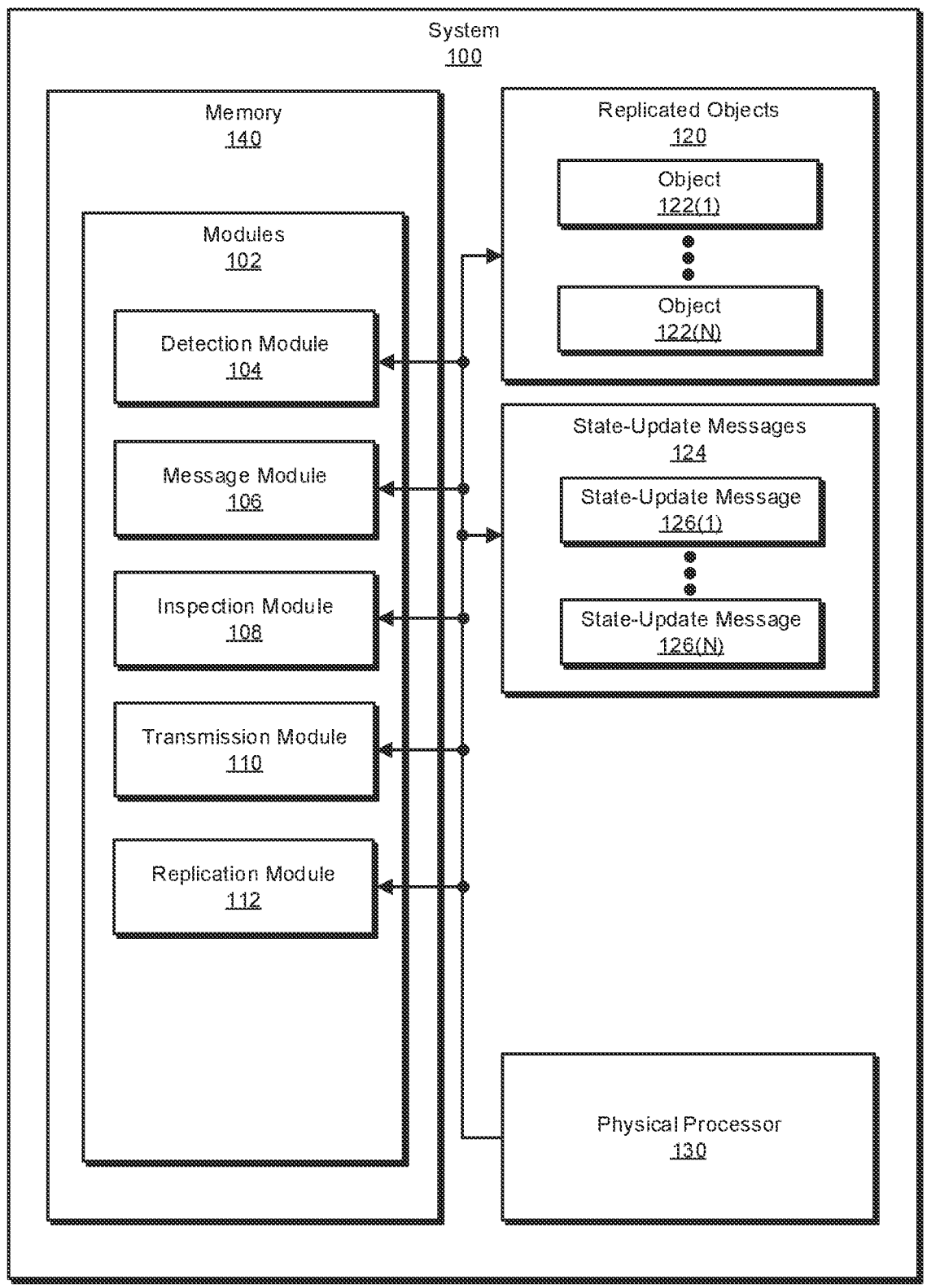
FIG. 1 is a block diagram of an exemplary system for synchronizing replicated objects across network nodes in highly scaled environments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for synchronizing replicated objects across network nodes in highly scaled environments. As will be explained in greater detail below, embodiments of the instant disclosure may set a transmission schedule that limits the number of state-update messages that are exchanged between primary and backup nodes in a highly scaled environment over a certain period of time. This transmission schedule may reduce and/or mitigate the burden and/or load imposed on the primary and/or backup nodes by transmitting the state-update messages at controlled intervals.

To achieve and/or accommodate this transmission schedule without missing important updates to replicated objects, the primary and backup nodes may maintain and/or keep status flags in connection with state-update messages that are queued for transmission. One or more of these status flags may indicate whether a certain state-update message is currently undergoing processing for transmission, whether a certain state-update message is currently undergoing a modification and/or update in the queue, and/or whether a certain queued state-update message includes outdated information representative of a previous change made to a replicated object. The primary and backup nodes may then rely on and/or use these status flags to make certain decisions in connection with such state-update messages. Examples of such decisions include, without limitation, postponing the transmission of certain state-update messages, postponing modifications to certain state-update messages in queues, superseding outdated information included in certain state-update messages in queues, combinations or variations of one or more of the same, and/or any other suitable decisions.

These embodiments may enable primary and backup nodes to achieve various advantages and/or improvements over traditional synchronization technologies. For example, the primary and backup nodes may be able to operate with a reduced queue size and/or expedite state updates due at least in part to the reduced queue size. In another example, the primary and backup nodes may be able to synchronize replicated object updates faster and/or without delays. In a further example, the primary and backup nodes may be able to reduce and/or mitigate the burden and/or load involved in both transmitting and receiving state-update messages. Additionally or alternatively, the primary and backup nodes may be able to decrease the amount of memory needed to achieve synchronization of updated objects.

The following will provide, with reference to FIGS. 1-5 detailed descriptions of exemplary apparatuses, systems, components, and corresponding implementations for synchronizing replicated objects across network nodes in highly scaled environments. Detailed descriptions of computer-implemented methods for synchronizing replicated objects across network nodes in highly scaled environments will be provided in connection with FIGS. 6 and 7. In addition, detailed descriptions of an exemplary computing system for carrying out these methods will be provided in connection with FIG. 8.

FIG. 1 shows an exemplary system 100 that facilitates synchronizing replicated objects across network nodes in highly scaled environments. As illustrated in FIG. 1, system 100 may include one or more modules 102 for performing one or more tasks. As will be explained in greater detail below, modules 102 may include a detection module 104, a message module 106, an inspection module 108, a transmission module 110, and/or a replication module 112. Although illustrated as separate elements, one or more of modules 102 in FIG. 1 may represent portions of a single module, application, and/or operating system. For example, detection module 104, message module 106, and/or inspection module 108 may be included in and/or represent part of replication module 112. Alternatively, detection module 104, message module 106, and/or inspection module 108 may be included in and/or represent part of transmission module 110.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., network nodes 206, 210(1)-(N), and 212(1)-(N) and/or computing devices 202 and 208), the devices illustrated in FIG. 3 (e.g., network nodes 206 and 210(1)), the devices illustrated in FIGS. 4 and 5 (e.g., network node 206), and/or the devices illustrated in FIG. 8 (e.g., computing system 800). One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate synchronizing replicated objects across network nodes in highly scaled environments. Examples of physical processor 130 include, without limitation, Central Processing Units (CPUs), microprocessors, microcontrollers, Field-Programmable Gate Arrays (FPGAs) that implement soft-core processors, Application-Specific Integrated Circuits (ASICs), portions of one or more of the same, variations or combinations of one or more of the same, and/or any other suitable physical processor.

As illustrated in FIG. 1, exemplary system 100 may further include one or more replicated objects, such as replicated objects 120. In some examples, replicated objects 120 may each constitute and/or represent any type or form of data structure, portion of data, and/or formatted unit of data that is replicated, stored, and/or reproduced across multiple computing devices. In such examples, replicated objects 120 may include and/or represent objects 122(1)-(N) that have each been replicated across a set of computing devices. In one example, one or more of objects 122(1)-(N) may include and/or represent a network socket (e.g. a TCP socket) that is replicated across multiple network nodes for high availability and/or backup purposes. In this example, the network socket may serve and/or function as an endpoint for sending and/or receiving communications across a network.

Additional examples of objects 122(1)-(N) include, without limitation, data representations of and/or references to physical devices or interfaces (such an "ifd" objects), logical devices or interfaces (such as an "ifl" objects), next hops, and/or routes (such as IPv4 or IPv6 routes), functions, variables, data structures, primitive types, records, route tables, forwarding tables, buffers, host cache entries, memory addresses, network addresses, state data, parameters, variations or combinations of one or more of the same, and/or any other suitable data objects.

As illustrated in FIG. 1, exemplary system 100 may additionally include one or more state-update messages, such as state-update messages 124. In some examples, state-update messages 124 may each constitute and/or represent any type or form of message, signal, and/or communication that facilitates updating the state of one or more objects replicated on a remote node. In such examples, state-update messages 124 may include and/or represent state-update messages 126(1)-(N) generated and/or transmitted by a local node within a network. In one example, one or more of state-update messages 124 may include and/or represent a TCP message or update. Additionally or alternatively, one or more of state-update messages 124 may include and/or represent a BGP message or update.

Figure 2:
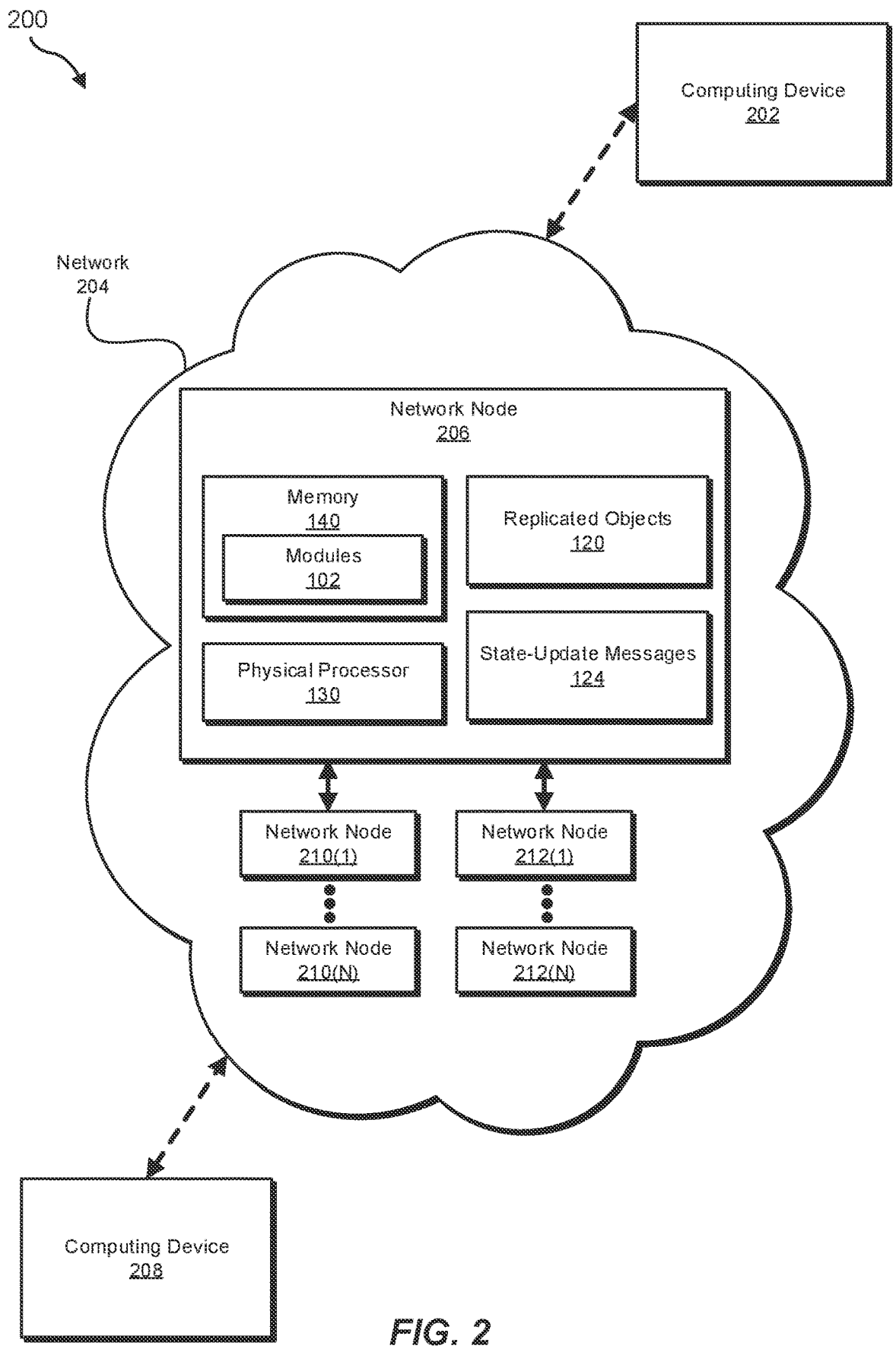
FIG. 2 is a block diagram of an additional exemplary system for synchronizing replicated objects across network nodes in highly scaled environments.

An apparatus for synchronizing replicated objects across network nodes in highly scaled environments may include all or portions of exemplary system 100. In some examples, system 100 in FIG. 1 may be implemented in a variety of ways. For example, all or a portion of exemplary system 100 may represent portions of exemplary system 200 in FIG. 2. As shown in FIG. 2, system 200 may include a network 204 that facilitates communication among a network node 206, network nodes 210(1)-(N), network nodes 212(1)-(N), a computing device 202, and/or a computing device 208.

As illustrated in FIG. 2, network 204 may include and/or represent various network devices and/or nodes that form and/or establish communication paths and/or segments. For example, network 204 may include network node 206, which forwards traffic from computing device 202 along one or more active paths toward computing device 208. In this example, an active path may include and/or represent network nodes 210(1)-(N), and another active path may include and/or represent network nodes 212(1)-(N).

In some embodiments, one or more of network nodes 206, 210(1)-(N), and 212(1)-(N) may include and/or represent an instance of memory 140 and/or an instance of physical processor 130. Additionally or alternatively, one or more of network nodes 206, 210(1)-(N), and 212(1)-(N) may generate, transmit, and/or receive one or more of state-update messages 124.

In certain embodiments, one or more of computing devices 202 and 208 may include and/or represent an instance of memory 140 and/or an instance of physical processor 130. Additionally or alternatively, one or more of computing devices 202 and 208 may generate, transmit, and/or receive one or more of state-update messages 124.

In some examples, and as will be described in greater detail below, one or more of modules 102 may cause network node 206 to (1) detect a change made to object 122(1) replicated across network node 206 and network node 210(1) within network 204, (2) modifying state-update message 126(1) destined for the backup node to account for the change made to object 122(1) on network node 210(1), (3) inspecting a status flag of state-update message 126(1) destined for network node 210(1), (4) determining, based at least in part on the status flag of state-update message 126(1), that state-update message 126(1) is ready for transmission to network node 210(1), and then in response to determining that state-update message 126(1) is ready for transmission, (5) transmitting state-update message 126(1) to the network node 210(1) to facilitate replicating the change to object 122(1) on network node 210(1).

Computing devices 202 and 208 as well as network nodes 206, 210(1)-(N), and 212(1)-(N) may each generally represent any type or form of physical computing device capable of reading computer-executable instructions and/or handling network traffic. In one example, one or more of computing devices 202 and 208 and/or network nodes 206, 210(1)-(N), and 212(1)-(N) may include and/or represent a router (such as a transit label switching router, a label edge router, a provider edge router, a hub router, a spoke router, an autonomous system boundary router, and/or an area border router). Additional examples of computing devices 202 and 208 and/or network nodes 206, 210(1)-(N), and 212(1)-(N) include, without limitation, switches, hubs, modems, bridges, repeaters, gateways (such as Broadband Network Gateways (BNGs)), multiplexers, network adapters, network interfaces, linecards, collectors, client devices, laptops, tablets, desktops, servers, cellular phones, Personal Digital Assistants (PDAs), multimedia players, embedded systems, wearable devices, gaming consoles, portions of one or more of the same, variations or combinations of one or more of the same, and/or any other suitable devices.

Network 204 generally represents any medium and/or architecture capable of facilitating communication and/or data transfer. In one example, network 204 may include any or all of computing devices 202 and 208 and/or network nodes 206, 210(1)-(N), and 212(1)-(N) even though some of these devices are illustrated as being external to network 204 in FIG. 2. Additionally or alternatively, network 204 may include other devices that facilitate communication among computing devices 202 and 208 and/or network nodes 206, 210(1)-(N), and 212(1)-(N). Network 204 may facilitate communication or data transfer using wireless and/or wired connections. Examples of network 204 include, without limitation, an intranet, an access network, a layer 2 network, a layer 3 network, a Multiprotocol Label Switching (MPLS) network, an Internet Protocol (IP) network, a heterogeneous network (e.g., layer 2, layer 3, IP, and/or MPLS) network, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 7:
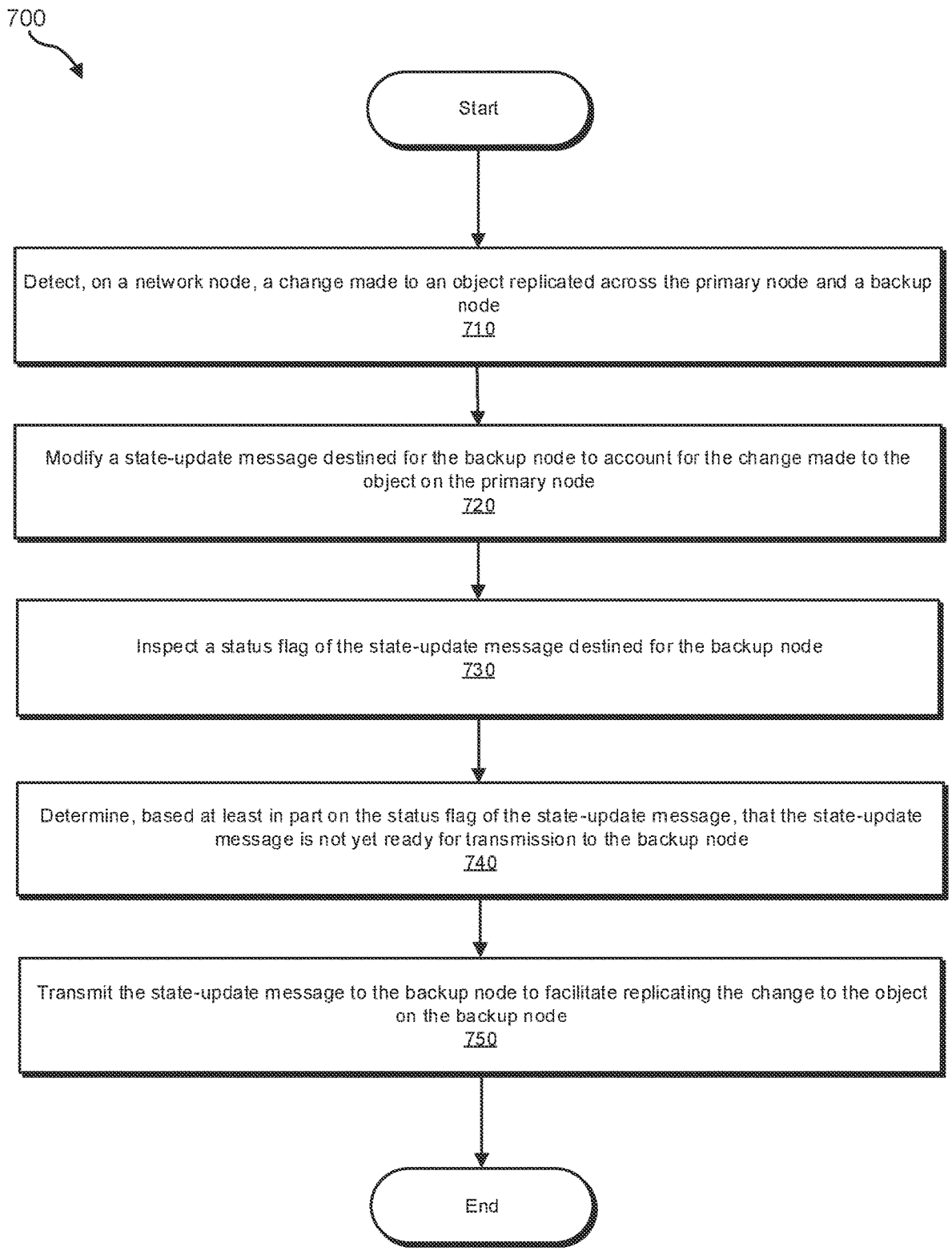
FIG. 7 is a flow diagram of an exemplary method for synchronizing replicated objects across network nodes in highly scaled environments.

FIG. 7 is a flow diagram of an exemplary computer-implemented method 700 for synchronizing replicated objects across network nodes in highly scaled environments. The steps shown in FIG. 7 may be performed by any suitable computer-executable code and/or computing system, including system 100 in FIG. 1, system 200 in FIG. 2, system 300 in FIG. 3, system 800 in FIG. 8, and/or variations or combinations of one or more of the same. In addition, the steps shown in FIG. 7 may be performed by any suitable node, device, and/or component included in system 100 in FIG. 1, system 200 in FIG. 2, system 300 in FIG. 3, system 800 in FIG. 8, and/or the like. In one example, each of the steps shown in FIG. 7 may represent an algorithm whose structure includes and/or is represented by multiple sub-steps, examples of which will be provided in greater detail below.

As illustrated in FIG. 7, at step 710 one or more of the systems described herein may detect a change made to an object replicated across a primary node and a backup node within a network. For example, detection module 104 may, as part of network node 206, detect a change made to object 122(1) replicated across network node 206 and network node 210(1) within network 204. In this example, object 122(1) may be replicated across network nodes 206 and 210(1). In one example, network node 206 may constitute and/or represent a primary node that is actively utilizing and/or responsible for supporting object 122(1). Additionally or alternatively, network node 210(1) may constitute and/or represent a backup node that replicates and/or is responsible for backing up object 122(1).

In some examples, object 122(1) may include and/or represent a network socket (e.g. a TCP socket) that is replicated across network nodes 206 and 210(1) for high availability and/or backup purposes. In such examples, the network socket may serve and/or function as an endpoint for sending and/or receiving communications across network 204.

In some examples, the change made to object 122(1) may include and/or represent updated parameters for object 122(1). For example, the change made to object 122(1) may include and/or represent a new state of one or more "snd.nxt" parameters, "rcv.nxt" parameters, window size parameters, "snd.una" parameters, socket buffer parameters, peer "ACK" parameters, and the like. Examples of changes made to object 122(1) include, without limitation, a change made to a sequence number of a first byte of data exchanged between a set of computing devices involved in a communication session, a change made to a sequence number of a next byte of data to be exchanged between a set of computing devices involved in a communication session, a change made to a window size of a communication session involving a set of computing devices, a change made to a congestion window of a communication session involving a set of computing devices, combinations or variations of one or more of the same, and/or any other suitable changes.

The systems described herein may perform step 710 in a variety of ways and/or contexts. In some examples, detection module 104 may monitor network node 206 for changes made to any objects that are replicated to a remote node. For example, detection module 104 may monitor a network socket (e.g., a TCP socket) implemented on network node 206 for any events indicative of changes made to one or more parameters of the network socket. While monitoring the network socket in this way, detection module 104 may identify and/or detect an event indicative of a change made to the network socket.

Additionally or alternatively, detection module 104 may monitor a network stack (e.g., the Open Systems Interconnection (OSI) model) implemented on network node 206 for changes made to any objects that are replicated to a remote node. For example, detection module 104 may monitor a network stack 402 in FIG. 4 for any changes made to replicated objects 120. While monitoring network stack 402 in this way, detection module 104 may identify and/or detect a changed object 422 in FIG. 4 traversing and/or passing through network stack 402. In this example, changed object 422 may include and/or represent an update and/or modification made to one of replicated objects 120.

Returning to FIG. 7, at step 720 one or more of the systems described herein may modify a state-update message destined for the backup node to account for the change made to the object on the primary node. For example, message module 106 may, as part of network node 206 in FIG. 2, modify state-update message 126(1) destined for network node 210(1) to account for the change made to object 122(1) on network node 206. In this example, state-update message 126(1) may facilitate updating the state of object 122(1) on network node 210(1) to reflect the changed state of object 122(1) on network node 206. Accordingly, state-update message 126(1) may enable network nodes 206 and 210(1) to synchronize the state of object 122(1) relative to one another.

The systems described herein may perform step 720 in a variety of ways and/or contexts. In some examples, message module 106 may insert information representative of the change made to object 122(1) on network node 206 into state-update message 126(1). For example, inspection module 108 may check and/or inspect a status flag of state-update message 126(1). In one example, inspection module 108 may determine, based at least in part on that status flag, that state-update message 126(1) includes outdated information representative of a previous change made to object 122(1) on network node 206. This previous change may not yet be reflected and/or propagated to object 122(1) as replicated on network node 206. In response to the determination that state-update message 126(1) includes such outdated information, message module 106 may supersede, supplant, and/or replace the outdated information with updated information representative of the change made to object 122(1).

In another example, inspection module 108 may determine, based at least in part on that status flag, that state-update message 126(1) does not include any information representative of a previous change made to object 122(1) on network node 206. In response to the determination that state-update message 126(1) does not include any such information, message module 106 may insert information representative of the change made to object 122(1) on network node 206 into state-update message 126(1).

Returning to FIG. 7, at step 730 one or more of the systems described herein may inspect a status flag of the state-update message destined for the backup node. For example, inspection module 108 may, as part of network node 206 in FIG. 2, inspect a status flag of state-update message 126(1) destined for network node 210(1). In this example, the status flag may include and/or represent a portion of metadata and/or a portion of a header associated with state-update message 126(1).

The systems described herein may perform step 730 in a variety of ways and/or contexts. In some examples, inspection module 108 may search state-update message 126(1) for any status flags. In such examples, inspection module 108 may identify, locate, and/or find one or more status flags during the search. In one embodiment, such status flags may each include and/or represent any portion of data (e.g., a bit of data, a byte of data, etc.) and/or data structure associated with state-update message 126(1).

In one example, a "processing" status flag of state-update message 126(1) may indicate and/or signify whether state-update message 126(1) is currently undergoing processing for transmission and/or has been written over the corresponding communication channel. In this example, network node 206 may prevent and/or prohibit the transmission of any subsequent updates to state-update message 126(1) if this "processing" status flag is set. Accordingly, network node 206 may allow and/or facilitate the transmission of such updates only after this "processing" status flag is cleared.

In another example, an "updated" status flag of state-update message 126(1) may indicate and/or signify whether state-update message 126(1) is currently undergoing an update and/or modification of any kind in the corresponding queue while awaiting transmission. In this example, network node 206 may prevent and/or prohibit the processing of any subsequent updates to state-update message 126(1) that become available while this "updated" status flag is set. Accordingly, network node 206 may allow and/or facilitate the processing of such updates only after this "updated" status flag is cleared.

In a further example, a "queued" status flag of state-update message 126(1) may indicate and/or signify whether state-update message 126(1) has a state update scheduled for transmission over the corresponding communication channel and/or includes outdated information representative of a previous change made to a replicated object. In this example, network node 206 may supersede, supplant, and/or replace certain outdated update information queued for transmission if any subsequent updates to state-update message 126(1) become available while this "queued" status flag is set. Alternatively, network node 206 may simply insert current state update information into state-update message 126(1) if this "queued" status flat is cleared.

Returning to FIG. 7, at step 740 one or more of the systems described herein may determine that the state-update message is ready for transmission to the backup node based at least in part on the status flag of the state-update message. For example, inspection module 108 may, as part of network node 206 in FIG. 2, determine that state-update message 126(1) is ready for transmission to network node 210(1) based at least in part on the status flag of state-update message 126(1). In one example, this status flag may constitute and/or represent a "processing" status flag indicative of whether state-update message 126(1) is currently undergoing processing for transmission and/or has been written over the corresponding communication channel. If cleared, this "processing" status flag may indicate that state-update message 126(1) is ready and/or available for transmission upon arriving at the appropriate position within the queue. If set, this "processing" status flag may indicate that state-update message 126(1) is not yet ready and/or available for transmission despite arriving at the appropriate position within the queue.

The systems described herein may perform step 740 in a variety of ways and/or contexts. In some examples, inspection module 108 may identify and/or detect the "processing" status flag of state-update message 126(1) as currently being cleared. In such examples, inspection module 108 may determine that state-update message 126(1) is ready and/or available for transmission to network node 210(1) due at least in part to the "processing" status flag currently being cleared.

In other examples, inspection module 108 may identify and/or detect the "processing" status flag of state-update message 126(1) as currently being set. In such examples, inspection module 108 may determine that state-update message 126(1) is not yet ready and/or available for transmission to network node 210(1) due at least in part to the "processing" status flag currently being set. As a result, inspection module 108 may cause and/or direct transmission module 110 and/or network node 206 to postpone and/or suspend the transmission of state-update message 126(1) until the "processing" status flag is cleared. In one example, after postponing the transmission of state-update message 126(1), inspection module 108 may subsequently determine that state-update message 126(1) is now ready and/or available for transmission to network node 210(1) due at least in part to the "processing" status flag having been cleared. In this example, inspection module 108 may notify and/or inform transmission module 110 and/or network node 206 of the "processing" status flag having been cleared.

In some examples, inspection module 108 may identify and/or detect the "updated" status flag of state-update message 126(1) as currently being cleared. In such examples, inspection module 108 may determine that state-update message 126(1) is ready and/or available to be modified in the corresponding queue due at least in part to the "updated" status flag currently being cleared.

In other examples, inspection module 108 may identify and/or detect the "updated" status flag of state-update message 126(1) as currently being set. In such examples, inspection module 108 may determine that state-update message 126(1) is not yet ready and/or available to be modified due at least in part to the "updated" status flag currently being set. As a result, inspection module 108 may cause and/or direct message module 106, replication module 112, and/or network node 206 to postpone and/or suspend the modification of state-update message 126(1) until the "updated" status flag is cleared.

In one example, after postponing the modification of state-update message 126(1), inspection module 108 may subsequently determine that state-update message 126(1) is now ready and/or available to be modified due at least in part to the "updated" status flag having been cleared. In this example, inspection module 108 may notify and/or inform message module 106, replication module 112, and/or network node 206 of the "updated" status flag having been cleared. In response to this notification and/or information, message module 106, replication module 112, and/or network node 206 may initiate a modification (e.g., one or more of the modifications described above in connection with step 720 in FIG. 7) to state-update message 126(1).

In some examples, inspection module 108 may identify and/or detect the "queued" status flag of state-update message 126(1) as currently being cleared. In such examples, inspection module 108 may determine that state-update message 126(1) does not yet include any information representative of a previous and/or pending change to object 122(1) on network node 206 due at least in part to the "queued" status flag currently being cleared. In response to this determination, inspection module 108 may notify and/or inform message module 106, replication module 112, and/or network node 206 of the "queued" status flag currently being cleared. In response to this notification and/or information, message module 106, replication module 112, and/or network node 206 may insert and/or add information representative of the change made to object 122(1) to state-update message 126(1).

In other examples, inspection module 108 may identify and/or detect the "queued" status flag of state-update message 126(1) as currently being set. In such examples, inspection module 108 may determine that state-update message 126(1) already includes some information representative of a previous and/or pending change to object 122(1) on network node 206 due at least in part to the "queued" status flag currently being set. This information may thus be considered outdated and/or obsolete in view of a subsequent update and/or change made to object 122(1). In response to this determination, inspection module 108 may notify and/or inform message module 106, replication module 112, and/or network node 206 of the "queued" status flag currently being set. In response to this notification and/or information, message module 106, replication module 112, and/or network node 206 may supersede, supplant, and/or replace this outdated information with new and/or updated information representative of the subsequent update and/or change made to object 122(1) in state-update message 126(1).

Figure 5:
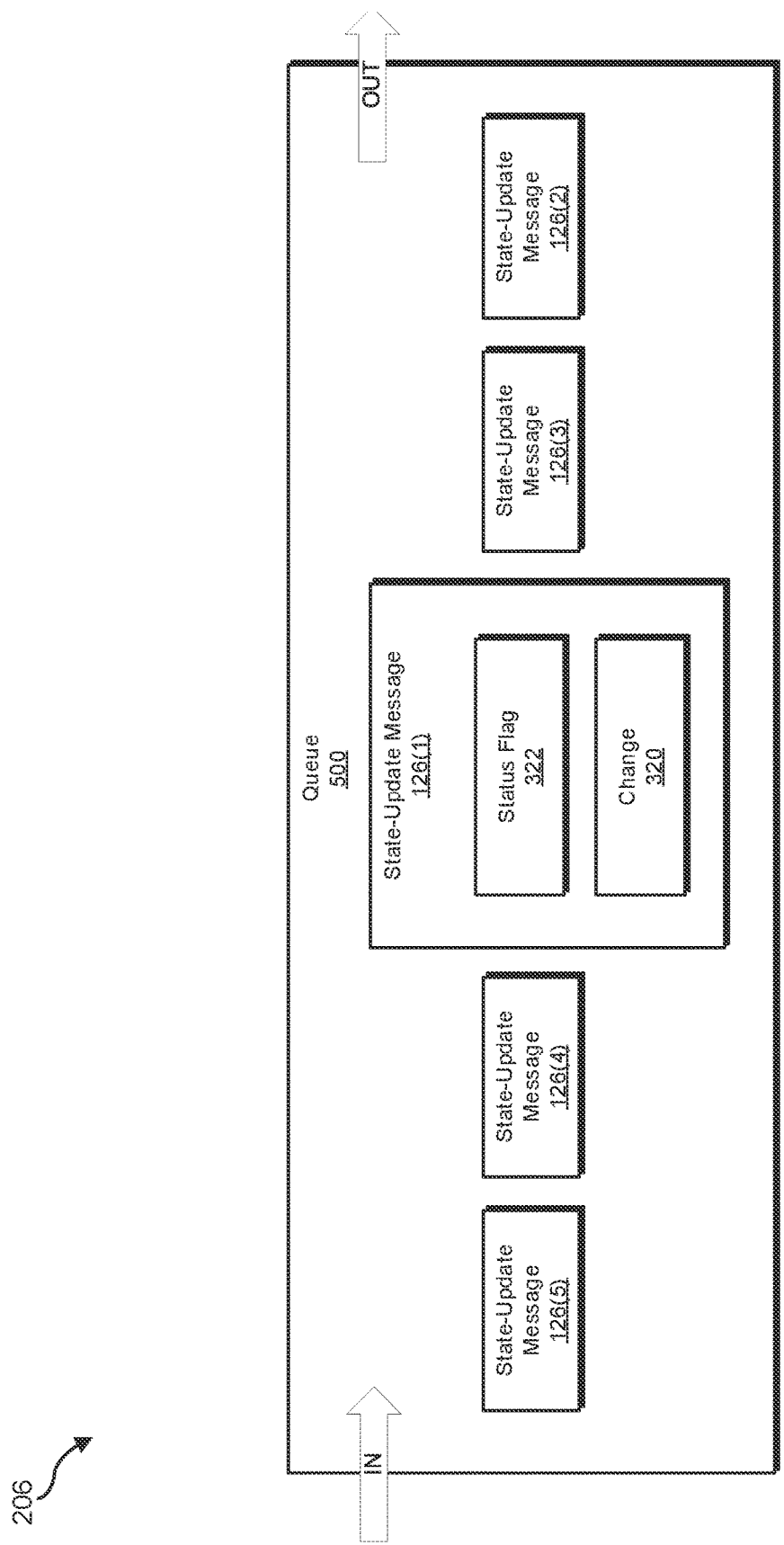
FIG. 5 is a block diagram of an exemplary network node that implements a queue for transmitting state-update messages to another network node.

FIG. 5 illustrates an exemplary queue 500 implemented on network node 206. As illustrated in FIG. 5, queue 500 may include and/or be loaded with state-update messages 126(1), 126(2), 126(3), 126(4), and 126(5). In one example, state-update messages 126(1)-(5) in FIG. 5 may be queued such that state-update message 126(2) is the next one scheduled for transmission, followed by state-update messages 126(3), 126(1), 126(4), and 126(5) in that order. In this example, state-update message 126(1), which is queued for transmission after state-update messages 126(2) and 126(3), may include and/or represent a status flag 322 and/or a change 320 made to an instance of object 122(1) on network node 206.

In one example, network node 206 may supersede, supplant, and/or replace change 320 made to object 122(1) with a more recent and/or up-to-date change made to object 122(1) within state-update message 126(1). In this example, network node 206 may be able to transmit state-update message 126(1) to network node 210(1) once status flag 322 indicates that state-update message 126(1) is ready and/or available for transmission.

Returning to FIG. 7, at step 750 one or more of the systems described herein may transmit the state-update message to the backup node to facilitate replicating the change to the object on the backup node. For example, transmission module 110 may, as part of network node 206 in FIG. 2, transmit state-update message 126(1) to network node 210(1) to facilitate replicating the change to object 122(1) on network node 210(1). In this example, transmission module 110 may initiate the transmission of state-update message 126(1) in response to the determination that state-update message 126(1) is ready and/or available for transmission. State-update message 126(1) may include and/or carry the information and/or data necessarily for network node 210(1) to update object 122(1) to reflect the change made on network node 206.

The systems described herein may perform step 750 in a variety of ways and/or contexts. In some examples, transmission module 110 may send, transmit, and/or forward state-update message 126(1) to network node 210(1) or another network node. For example, transmission module 110 may cause and/or direct network node 206 to send, transmit, and/or forward state-update message 126(1) to network node 210(1) or another network node. Upon receiving state-update message 126(1), network node 210(1) may be able to replicate and/or reproduce the change made to object 122(1) on network node 206 based at least in part on the information and/or data included in state-update message 126(1).

In some examples, transmission module 110 may set a transmission schedule that limits the number of state-update messages that are transmitted by network node 206 over a certain period of time. For example, the transmission schedule may limit network node 206 to transmitting a maximum of 30,000 state-update messages per second. In this example, this transmission schedule may cause and/or direct network node 206 to transmit a new state-update message every 33 microseconds or so. In one example, transmission module 110 may delay the transmission of state-update message 126(1) to comply with the transmission schedule. Transmission module 110 may then determine that the transmission of state-update message 126(1) has been delayed a sufficient amount of time to comply with the transmission schedule.

Figure 3:
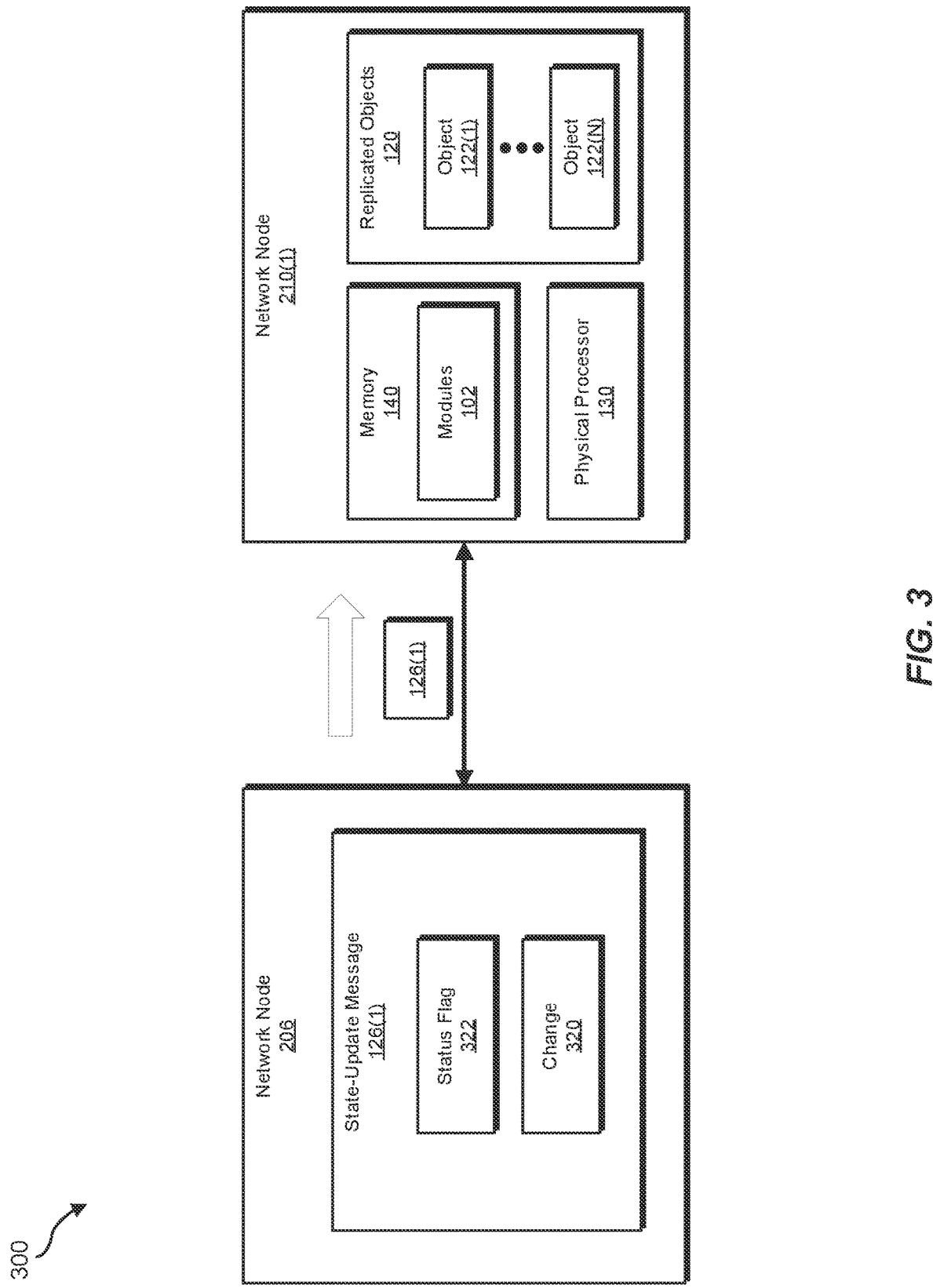
FIG. 3 is a block diagram of an exemplary implementation for synchronizing replicated objects across network nodes in highly scaled environments.
Figure 4:
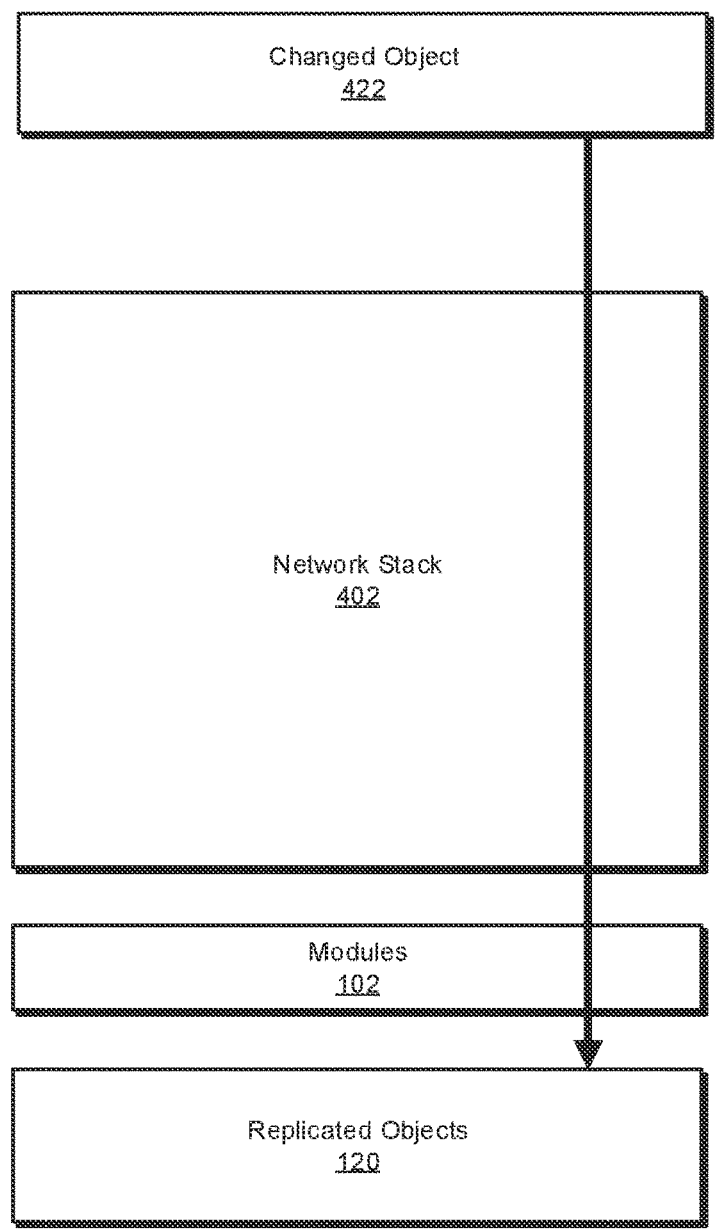
FIG. 4 is a block diagram of an exemplary network node that makes a change to an object that is replicated to another network node.

FIG. 3 illustrates an exemplary system 300 that includes and/or represents network nodes 206 and 210(1). As illustrated in FIG. 3, network node 206 may generate and/or transmit state-update message 126(1). In one example, state-update message 126(1) may include and/or represent a status flag 322 and/or a change 320 made to an instance of object 122(1) on network node 206. In this example, network node 206 may transmit state-update message 126(1) to network node 210(1) once status flag 322 indicates that state-update message 126(1) is ready and/or available for transmission. Network node 210(1) may then update and/or modify its replicated instance of object 122(1) based at least in part on change 320 included and/or represented in state-update message 126(1).

In some examples, both senders and receivers may be able to use and/or implement state-update messages and/or status flags as described above in connection with FIGS. 1-5 and 7. For example, network node 210(1) may receive state-update message 126(1) from network node 206. In this example, network node 210(1) may replicate and/or reproduce the change included in state-update message 126(1).

In some examples, message module 106 may, as part of network node 210(1), modify an additional state-update message destined for network node 206. In such examples, the additional state-update message may be intended to confirm the replication of the change to the instance of object 122(1) on network node 210(1). In one example, inspection module 108 may, as part of network node 210(1), determine that the additional state-update message is ready for transmission to network node 206 based at least in part on the additional status flag of the state-update message. In response to this determination, transmission module 110 may transmit the additional state-update message to the primary node to facilitate confirming the replication of the change to the object on network node 210(1).

In some examples, inspection module 108 may identify and/or detect the "processing" status flag of the additional state-update message as currently being cleared. In such examples, inspection module 108 may determine that the additional state-update message is ready and/or available for transmission to network node 206 due at least in part to the "processing" status flag currently being cleared.

In other examples, inspection module 108 may identify and/or detect the "processing" status flag of the additional state-update message as currently being set. In such examples, inspection module 108 may determine that the additional state-update message is not yet ready and/or available for transmission to network node 206 due at least in part to the "processing" status flag currently being set. As a result, inspection module 108 may cause and/or direct transmission module 110 and/or network node 210(1) to postpone and/or suspend the transmission of the additional state-update message until the "processing" status flag is cleared. In one example, after postponing the transmission of the additional state-update message, inspection module 108 may subsequently determine that the additional state-update message is now ready and/or available for transmission to network node 206 due at least in part to the "processing" status flag having been cleared. In this example, inspection module 108 may notify and/or inform transmission module 110 and/or network node 210(1) of the "processing" status flag having been cleared.

In some examples, inspection module 108 may identify and/or detect the "updated" status flag of the additional state-update message as currently being cleared. In such examples, inspection module 108 may determine that the additional state-update message is ready and/or available to be modified in the corresponding queue due at least in part to the "updated" status flag currently being cleared.

In other examples, inspection module 108 may identify and/or detect the "updated" status flag of the additional state-update message as currently being set. In such examples, inspection module 108 may determine that the additional state-update message is not yet ready and/or available to be modified due at least in part to the "updated" status flag currently being set. As a result, inspection module 108 may cause and/or direct message module 106, replication module 112, and/or network node 210(1) to postpone and/or suspend the modification of the additional state-update message until the "updated" status flag is cleared.

In one example, after postponing the modification of the additional state-update message, inspection module 108 may subsequently determine that the additional state-update message is now ready and/or available to be modified due at least in part to the "updated" status flag having been cleared. In this example, inspection module 108 may notify and/or inform message module 106, replication module 112, and/or network node 210(1) of the "updated" status flag having been cleared. In response to this notification and/or information, message module 106, replication module 112, and/or network node 210 may initiate a modification (e.g., one or more of the modifications described above in connection with step 720 in FIG. 7) to the additional state-update message.

In some examples, inspection module 108 may identify and/or detect the "queued" status flag of the additional state-update message as currently being cleared. In such examples, inspection module 108 may determine that the additional state-update message does not yet include any information representative of a previous and/or pending change to object 122(1) on network node 210(1) due at least in part to the "queued" status flag currently being cleared. In response to this determination, inspection module 108 may notify and/or inform message module 106, replication module 112, and/or network node 210(1) of the "queued" status flag currently being cleared. In response to this notification and/or information, message module 106, replication module 112, and/or network node 210(1) may insert and/or add information representative of the change replicated to object 122(1) to the additional state-update message.

In other examples, inspection module 108 may identify and/or detect the "queued" status flag of the additional state-update message as currently being set. In such examples, inspection module 108 may determine that the additional state-update message already includes some information representative of a previous and/or pending change to object 122(1) on network node 210(1) due at least in part to the "queued" status flag currently being set. This information may thus be considered outdated and/or obsolete in view of a subsequent update and/or change replicated to object 122(1). In response to this determination, inspection module 108 may notify and/or inform message module 106, replication module 112, and/or network node 210(1) of the "queued" status flag currently being set. In response to this notification and/or information, message module 106, replication module 112, and/or network node 210(1) may supersede, supplant, and/or replace this outdated information with new and/or updated information representative of the subsequent update and/or change replicated to object 122(1) in the additional state-update message.

Figure 6:
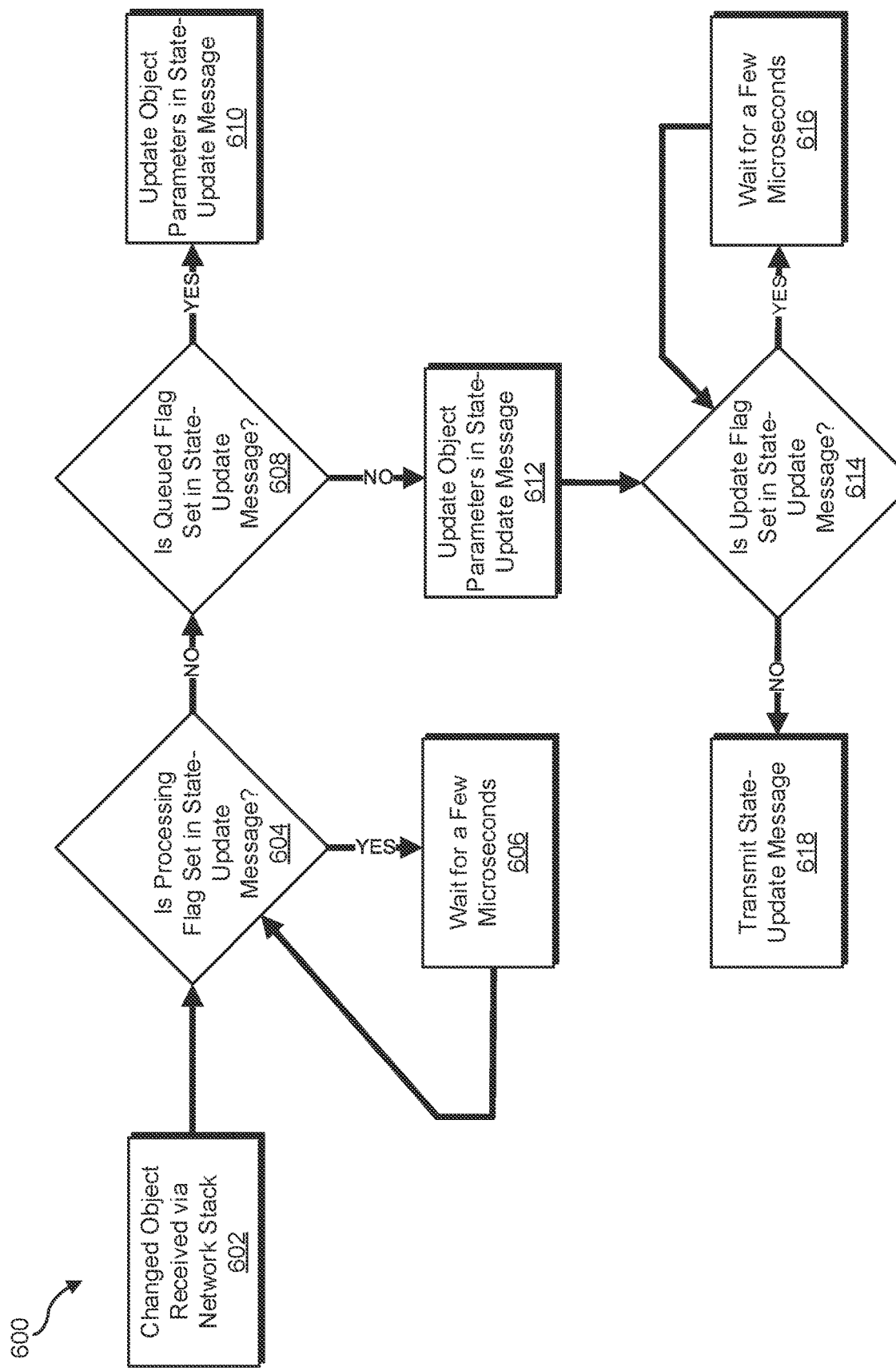
FIG. 6 is a flow diagram of an exemplary method for synchronizing replicated objects across network nodes in highly scaled environments.

FIG. 6 is a flow diagram of an additional exemplary computer-implemented method 600 for synchronizing replicated objects across network nodes in highly scaled environments. The steps shown in FIG. 6 may be performed by any suitable computer-executable code and/or computing system, including system 100 in FIG. 1, system 200 in FIG. 2, system 300 in FIG. 3, system 800 in FIG. 8, and/or variations or combinations of one or more of the same. In addition, the steps shown in FIG. 6 may be performed by any suitable node, device, and/or component included in system 100 in FIG. 1, system 200 in FIG. 2, system 300 in FIG. 3, system 800 in FIG. 8, and/or the like. In one example, each of the steps shown in FIG. 6 may represent an algorithm whose structure includes and/or is represented by multiple sub-steps, examples of which will be provided in greater detail below.

As illustrated in FIG. 6, at step 602 one or more of the systems described herein may receive a changed object via a network stack. For example, detection module 104 may, as part of network node 206, detect and/or receive a changed object via a network stack. In one example, the changed object may include and/or represent one or more updated parameters of a network socket (e.g., a TCP socket).

At step 604 in FIG. 6, one or more of the systems described herein may determine whether a "processing" status flag is set in a state-update message corresponding to the changed object. For example, inspection module 108 may, as part of network node 206, inspect a state-update message corresponding to the changed object. In this example, inspection module 108 may determine whether a "processing" status flag is set in the state-update message based at least in part on the inspection. If the "processing" status flag is set, inspection module 108 may wait a few microseconds before checking the "processing" status flag again in accordance with step 606 in FIG. 6. However, if the "processing" status flag is cleared and/or not set, inspection module 108 may advance method 600 toward step 608 in FIG. 6.

At step 608 in FIG. 6, one or more of the systems described herein may determine whether a "queued" status flag is set in the state-update message corresponding to the changed object. For example, inspection module 108 may determine whether a "queued" status flag is set in the state-update message based at least in part on the inspection. If the "queued" status flag is set, message module 106 and/or replication module 112 may update one or more object parameters in the state-update message to account for the changed object in accordance with step 610 in FIG. 6. However, if the "processing" status flag is cleared and/or not set, message module 106 and/or replication module 112 may update one or more object parameters in the state-update message to account for the changed object in accordance with step 612 in FIG. 6 and then advance method 600 toward step 614 in FIG. 6.

At step 614 in FIG. 6, one or more of the systems described herein may determine whether an "updated" status flag is set in the state-update message corresponding to the changed object. For example, inspection module 108 may determine whether an "updated" status flag is set in the state-update message based at least in part on the inspection. If the "updated" status flag is set, inspection module 108 may wait a few microseconds before checking the "updated" status flag again in accordance with step 616 in FIG. 6. However, if the "updated" status flag is cleared and/or not set, transmission module 110 may transmit the state-update message to a remote network node that includes and/or stores a replicated copy of the object in accordance with step 618 in FIG. 6. The remote network node may then update the replicated copy of the object to reflect the changed object detected on network node 206 based at least in part on the state-update message.

Figure 8:
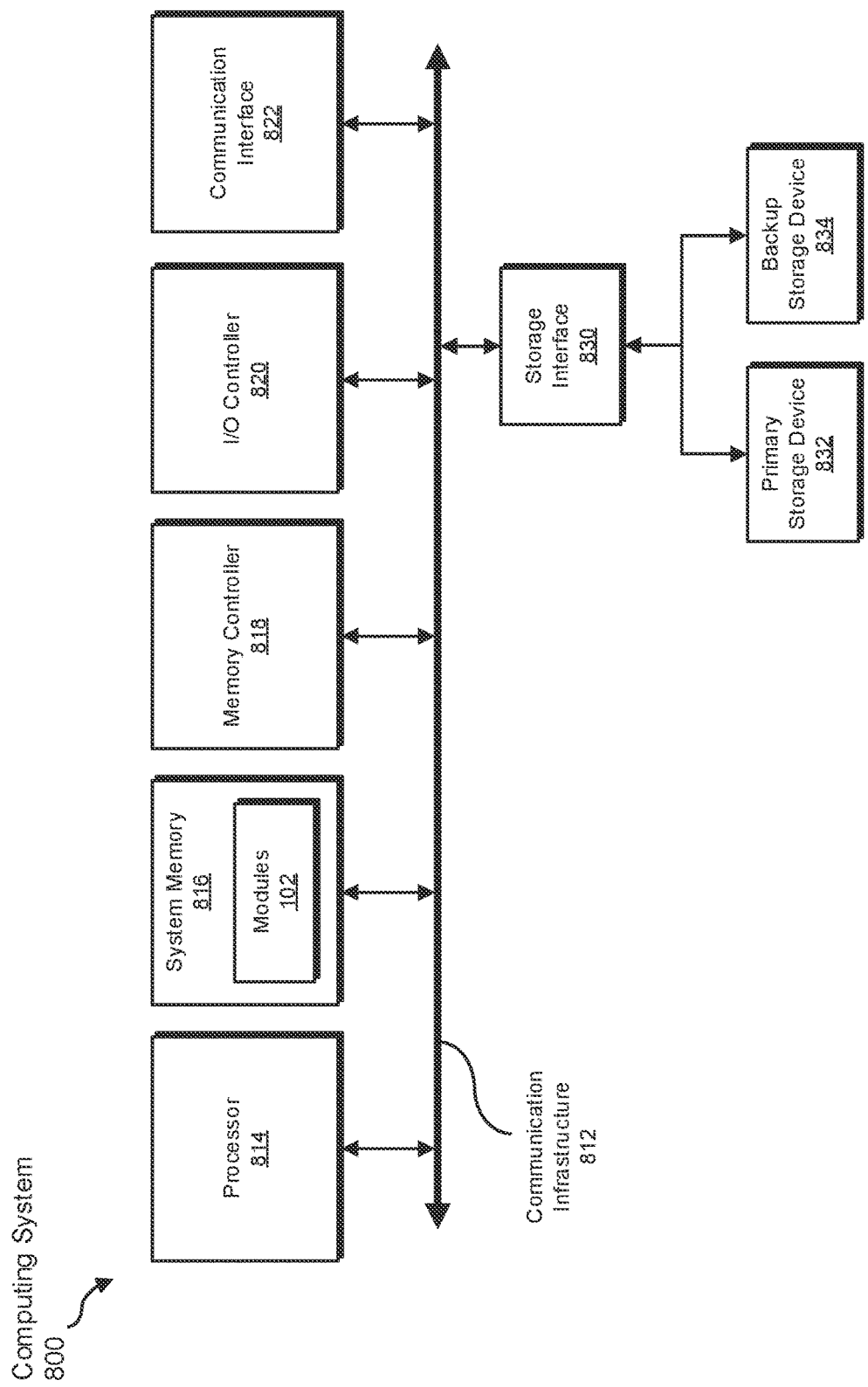
FIG. 8 is a block diagram of an exemplary computing system capable of implementing and/or being used in connection with one or more of the embodiments described and/or illustrated herein.

FIG. 8 is a block diagram of an exemplary computing system 800 capable of implementing and/or being used in connection with one or more of the embodiments described and/or illustrated herein. In some embodiments, all or a portion of computing system 800 may perform and/or be a means for performing, either alone or in combination with other elements, one or more of the steps described in connection with FIG. 3. All or a portion of computing system 800 may also perform and/or be a means for performing and/or implementing any other steps, methods, or processes described and/or illustrated herein.

Computing system 800 broadly represents any type or form of electrical load, including a single or multi-processor computing device or system capable of executing computer-readable instructions. Examples of computing system 800 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 800 may be programmed, configured, and/or otherwise designed to comply with one or more networking protocols. According to certain embodiments, computing system 800 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 800 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 800 may include various network and/or computing components. For example, computing system 800 may include at least one processor 814 and a system memory 816. Processor 814 generally represents any type or form of processing unit capable of processing data or interpreting and executing instructions. For example, processor 814 may represent an application-specific integrated circuit (ASIC), a system on a chip (e.g., a network processor), a hardware accelerator, a general purpose processor, and/or any other suitable processing element.

Processor 814 may process data according to one or more of the networking protocols discussed above. For example, processor 814 may execute or implement a portion of a protocol stack, may process packets, may perform memory operations (e.g., queuing packets for later processing), may execute end-user applications, and/or may perform any other processing tasks.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 800 may include both a volatile memory unit (such as, for example, system memory 816) and a non-volatile storage device (such as, for example, primary storage device 832, as described in detail below). System memory 816 may be implemented as shared memory and/or distributed memory in a network device. Furthermore, system memory 816 may store packets and/or other information used in networking operations.

In certain embodiments, exemplary computing system 800 may also include one or more components or elements in addition to processor 814 and system memory 816. For example, as illustrated in FIG. 8, computing system 800 may include a memory controller 818, an Input/Output (I/O) controller 820, and a communication interface 822, each of which may be interconnected via communication infrastructure 812. Communication infrastructure 812 generally represents any type or form of infrastructure capable of facilitating communication between one or more components of a computing device. Examples of communication infrastructure 812 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 818 generally represents any type or form of device capable of handling memory or data or controlling communication between one or more components of computing system 800. For example, in certain embodiments memory controller 818 may control communication between processor 814, system memory 816, and I/O controller 820 via communication infrastructure 812. In some embodiments, memory controller 818 may include a Direct Memory Access (DMA) unit that may transfer data (e.g., packets) to or from a link adapter.

I/O controller 820 generally represents any type or form of device or module capable of coordinating and/or controlling the input and output functions of a computing device. For example, in certain embodiments I/O controller 820 may control or facilitate transfer of data between one or more elements of computing system 800, such as processor 814, system memory 816, communication interface 822, and storage interface 830.

Communication interface 822 broadly represents any type or form of communication device or adapter capable of facilitating communication between exemplary computing system 800 and one or more additional devices. For example, in certain embodiments communication interface 822 may facilitate communication between computing system 800 and a private or public network including additional computing systems. Examples of communication interface 822 include, without limitation, a link adapter, a wired network interface (such as a network interface card), a wireless network interface (such as a wireless network interface card), and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 822 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also enable computing system 800 to engage in distributed or remote computing. For example, communication interface 822 may receive instructions from a remote device or send instructions to a remote device for execution.

As illustrated in FIG. 8, exemplary computing system 800 may also include a primary storage device 832 and/or a backup storage device 834 coupled to communication infrastructure 812 via a storage interface 830. Storage devices 832 and 834 generally represent any type or form of storage device or medium capable of storing data and/or other computer-readable instructions. For example, storage devices 832 and 834 may represent a magnetic disk drive (e.g., a so-called hard drive), a solid state drive, a floppy disk drive, a magnetic tape drive, an optical disk drive, a flash drive, or the like. Storage interface 830 generally represents any type or form of interface or device for transferring data between storage devices 832 and 834 and other components of computing system 800.

In certain embodiments, storage devices 832 and 834 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 834 may also include other similar structures or devices for allowing computer software, data, or other computer-readable instructions to be loaded into computing system 800. For example, storage devices 832 and 834 may be configured to read and write software, data, or other computer-readable information. Storage devices 832 and 834 may be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from those shown in FIG. 8. Computing system 800 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   detecting, on a primary node within a network, a change made to an object replicated across the primary node and a backup node within the network;
   modifying a state-update message destined for the backup node to account for the change made to the object on the primary node;
   inspecting a status flag of the state-update message destined for the backup node;
   determining, based at least in part on the status flag of the state-update message, that the state-update message is ready for transmission to the backup node; and
   in response to determining that the state-update message is ready for transmission, transmitting the state-update message to the backup node to facilitate replicating the change to the object on the backup node.

2. The method of claim 1, further comprising:
   determining, based at least in part on the status flag of the state-update message, that the state-update message is not yet ready for transmission to the backup node; and
   postponing the transmission of the state-update message until the status flag indicates that the state-update message is ready for transmission to the backup node.

3. The method of claim 2, wherein determining that the state-update message is ready for transmission comprises, after postponing the transmission of the state-update message, determining that the state-update message is ready for transmission.

4. The method of claim 1, further comprising:
   determining, based at least in part on the status flag of the state-update message, that the state-update message is not yet ready to be modified; and
   postponing the modification of the state-update message until the status flag indicates that the state-update message is ready to be modified.

5. The method of claim 4, further comprising, after postponing the modification of the state-update message, determining that the state-update message is ready to be modified; and
   wherein modifying the state-update message comprising initiating the modification to the state-update message in response to determining that the state-update message is ready to be modified.

6. The method of claim 1, further comprising:
   determining, based at least in part on the status flag of the state-update message, that the state-update message includes outdated information representative of a previous change made to the object on the primary node; and
   in response to determining that the state-update message includes the outdated information, superseding the outdated information with updated information representative of the change made to the object to the state-update message.

7. The method of claim 1, further comprising:
   determining, based at least in part on the status flag of the state-update message, that the state-update message does not include any information representative of a previous change made to the object on the primary node; and
   in response to determining that the state-update message does not include any information representative of a previous change made to the object on the primary node, inserting information representative of the change made to the object on the primary node into the state-update message.

8. The method of claim 1, wherein detecting the change made to the object comprises:
   monitoring a network socket on the primary node for events indicative of changes made to one or more parameters of the network socket; and
   while monitoring the network socket, detecting an event indicative of the change made to the one or more parameters of the network socket.

9. The method of claim 1, wherein:
   the object comprises a network socket replicated across the primary node and the backup node; and
   the change made to the object comprises at least one of:
      a change made to a sequence number of a first byte of data exchanged between a set of computing devices involved in a communication session;
      a change made to a sequence number of a next byte of data to be exchanged between a set of computing devices involved in a communication session;
      a change made to a window size of a communication session involving a set of computing devices; and
      a change made to a congestion window of a communication session involving a set of computing devices.

10. The method of claim 1, further comprising setting a transmission schedule that limits the number of state-update messages that are transmitted by the primary node over a certain period of time; and
    wherein determining that the state-update message is ready for transmission comprises:
       delaying the transmission of the state-update message; and
       determining that the transmission of the state-update message has been delayed by a sufficient amount of time to comply with the transmission schedule.

11. The method of claim 1, further comprising:
receiving, on the backup node, the state-update message transmitted by the primary node;
replicating the change to the object on the backup node;
modifying an additional state-update message destined for the primary node to confirm the replication of the change to the object on the backup node;
inspecting an additional status flag of the additional state-update message destined for the primary node;
determining, based at least in part on the additional status flag of the state-update message, that the additional state-update message is ready for transmission to the primary node; and
in response to determining that the additional state-update message is ready for transmission, transmitting the additional state-update message to the primary node to facilitate confirming the replication of the change to the object on the backup node.

12. The method of claim 11, further comprising:
determining, based at least in part on the status flag of the additional state-update message, that the additional state-update message is not yet ready for transmission to the primary node; and
postponing the transmission of the additional state-update message until the additional status flag indicates that the additional state-update message is ready for transmission to the primary node.

13. The method of claim 12, wherein determining that the additional state-update message is ready for transmission comprises, after postponing the transmission of the additional state-update message, determining that the additional state-update message is ready for transmission.

14. The method of claim 11, further comprising:
determining, based at least in part on the additional status flag of the additional state-update message, that the additional state-update message is not yet ready to be modified; and
postponing the modification of the additional state-update message until the additional status flag indicates that the additional state-update message is ready to be modified.

15. The method of claim 14, further comprising, after postponing the modification of the additional state-update message, determining that the additional state-update message is ready to be modified; and
wherein modifying the additional state-update message comprising initiating the modification to the additional state-update message in response to determining that the additional state-update message is ready to be modified.

16. The method of claim 11, further comprising:
determining, based at least in part on the additional status flag of the additional state-update message, that the additional state-update message includes outdated information representative of a previous change replicated to the object on the backup node; and
in response to determining that the additional state-update message includes the outdated information, superseding the outdated information with updated information representative of the change replicated to the object on the backup node.

17. The method of claim 11, further comprising:
determining, based at least in part on the additional status flag of the additional state-update message, that the additional state-update message does not include any information representative of a previous change replicated to the object on the backup node; and
in response to determining that the additional state-update message does not include any information representative of a previous change replicated to the object on the backup node, inserting information representative of the change replicated to the object on the backup node into the additional state-update message.

18. A system comprising:
a detection module, stored in memory on a primary node within a network, that detects a change made to an object replicated across the primary node and a backup node within the network;
a message module, stored in memory on the primary node, that modifies a state-update message destined for the backup node to account for the change made to the object on the primary node;
an inspection module, stored in memory on the primary node, that:
inspects a status flag of the state-update message destined for the backup node; and
determines, based at least in part on the status flag of the state-update message, that the state-update message is ready for transmission to the backup node; and
a transmission module, stored in memory on the primary node, that transmits the state-update message to the backup node to facilitate replicating the change to the object on the backup node; and
at least one physical processor that executes the detection module, the message module, the inspection module, the inspection module, and the transmission module.

19. The system of claim 18, wherein the inspection module:
determines, based at least in part on the status flag of the state-update message, that the state-update message is not yet ready for transmission to the backup node; and
causes the transmission module to postpone the transmission of the state-update message until the status flag indicates that the state-update message is ready for transmission to the backup node.

20. An apparatus comprising:
at least one storage device that stores a set of objects replicated across a primary node and a backup node within a network; and
at least one physical processor communicatively coupled to the storage device, wherein the physical processor:
detects, on the primary node, a change made to one of the objects replicated across the primary node and the backup node within the network;
modifies a state-update message destined for the backup node to account for the change made to the one of the objects on the primary node;
inspects a status flag of the state-update message destined for the backup node;
determines, based at least in part on the status flag of the state-update message, that the state-update message is ready for transmission to the backup node; and
transmits, in response to determining that the state-update message is ready for transmission, the state-update message to the backup node to facilitate replicating the change to the one of the objects on the backup node.

* * * * *